UNITED STATES PATENT OFFICE.

FRIEDRICH AUGUST VOLKMAR KLOPFER, OF LEUBNITZ, NEAR DRESDEN, GERMANY.

PRODUCTION OF STARCH AND GLUTEN FROM WHEAT-FLOUR.

1,013,497.      Specification of Letters Patent.      Patented Jan. 2, 1912.

No Drawing.      Application filed September 24, 1908. Serial No. 454,622.

*To all whom it may concern:*

Be it known that I, FRIEDRICH AUGUST VOLKMAR KLOPFER, a subject of the King of Saxony, and resident of Dohnaerstrasse 64, Leubnitz, near Dresden, Kingdom of Saxony, German Empire, have invented a new and useful Improvement in the Production of Starch and Gluten from Wheat-Flour, of which the following is a specification.

This invention relates to the production of starch and gluten from wheat flour and has for its object a novel process whereby it is rendered possible firstly to separate without any chemicals, the big-grained starch from an undamaged albuminous pulp containing the insoluble albumin, the small-grained starch, the soluble carbohydrates and the soluble albumin and salts.

According to a known method wheat flour and water are mixed together and sodium chlorid in very small quantities up to 1 per cent. is added to such mixture in order not to dissolve the albuminous substance but only to loosen the gluten cells and obtain separately the big-grained starch, the small-grained starch, the insoluble albumin and the extract containing the soluble albumin, the soluble carbohydrates and the salts.

Now according to the process forming the subject of the present invention, the action of the sodium chlorid is replaced by the action of an enzym. For this purpose the wheat flour is mixed with an aqueous extract of green malt or with wet malt flour, that is to say, with substances containing the diastase. Afterward the mixture is exposed to the action of closed centrifugal machines. The centrifugal machine used for the process is provided with an imperforate drum so that the starch may collect during the centrifugal action on the wall of the drum while the layer composed of albuminous matter will adjust itself in proximity to the longitudinal axis of the drum.

By the addition of such substances containing diastase even the smallest denaturalization of the albumin effected in employing sodium chlorid is avoided, but, by the action of the diastase a loosening of the ethmose, the gluten-cells and a quicker and more precise separation of the starch-bodies from the wheat flour is obtained. The stirring operation and the subsequent centrifuging operation may, in consequence of this, be shortened essentially. The yield of pure starch is increased and the starch so obtained is free from any adherent albumin. The action described can be attributed to the known fact that the enzyms of the malt are able to exert a proteolytic effect.

In carrying out the process described before, the water together with an extract of green malt or with the malt flour may be added to the wheat flour or it may be added to the wheat flour prior to the addition of such substances. Generally the malt flour or extract of green malt will be employed in such a manner that from 1 to 3 parts of dry malt substance will be mixed with 100 parts of wheat flour and the action of the enzyms on the wheat flour will take place at ordinary temperature, for example, 10° to 15° C. Besides the enzyms contained in the malt or malt-extract, other enzyms reducing albumin, for instance the extract of *Carica papaya*, obtained from a kind of fig, or other peptonizing enzyms may be used in carrying out the process described according to the present invention.

In carrying out the process as set forth above, the diastatic agent is allowed to act for say about twenty minutes, and the centrifugal action may continue for about fifteen minutes, making the whole period of the process as described but a little over half an hour.

What I claim is:

1. The process for the production of starch and protein from wheat flour, which consists, first, in subjecting the wheat flour to the action of proteolytic ferments at ordinary temperatures for loosening the gluten cells of the wheat, and, secondly, in separating the large grain starch from the other components of the flour by centrifugal action in a closed separator.

2. The process for the production of large grain starch and protein from wheat flour, which consists in subjecting the wheat flour to the action of a proteolytic enzym and water at ordinary temperatures and then separating the large grain starch by centrifugal action.

In testimony, that I claim the foregoing as my invention, I have signed my name in presence of two witnesses, this 14th day of September, 1908.

FRIEDRICH AUGUST VOLKMAR KLOPFER.

Witnesses:
PAUL ARRAS,
CLÄRE SIMON.